(12) United States Patent
Son et al.

(10) Patent No.: US 9,874,257 B2
(45) Date of Patent: Jan. 23, 2018

(54) ELECTRIC CALIPER BRAKE

(71) Applicant: MANDO CORPORATION, Gyeonggi-do (KR)

(72) Inventors: Jong-Gu Son, Seoul (KR); Young-Hun Kong, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/272,384

(22) Filed: Sep. 21, 2016

(65) Prior Publication Data
US 2017/0082161 A1    Mar. 23, 2017

(30) Foreign Application Priority Data

Sep. 22, 2015 (KR) .................. 10-2015-0133593

(51) Int. Cl.
| F16D 55/26 | (2006.01) |
|---|---|
| F16D 65/18 | (2006.01) |
| F16D 55/225 | (2006.01) |
| F16D 55/226 | (2006.01) |
| F16D 121/04 | (2012.01) |
| F16D 121/24 | (2012.01) |

(Continued)

(52) U.S. Cl.
CPC ........... *F16D 65/18* (2013.01); *F16D 55/225* (2013.01); *F16D 55/2262* (2013.01); *F16D 65/183* (2013.01); *F16D 2121/04* (2013.01); *F16D 2121/24* (2013.01); *F16D 2125/06* (2013.01); *F16D 2125/40* (2013.01)

(58) Field of Classification Search
CPC .. F16D 65/18; F16D 2125/40; F16D 2121/04; F16D 55/227; F16D 2125/06; F16D 65/46; F16D 65/22; F16D 65/12; F16D 55/22

USPC ....................................................... 188/72.6
See application file for complete search history.

(56) References Cited

U.S. PATENT DOCUMENTS

| 5,219,047 A | * | 6/1993 | Fouilleux | ............ F16D 65/0979 |
|---|---|---|---|---|
| | | | | 188/106 F |
| 2009/0107777 A1 | * | 4/2009 | Kim | ........................ F16D 65/18 |
| | | | | 188/72.7 |

(Continued)

FOREIGN PATENT DOCUMENTS

KR    10-1220294    1/2013

*Primary Examiner* — Anna M Momper
*Assistant Examiner* — Mahbubur Rashid
(74) *Attorney, Agent, or Firm* — Ladas & Parry, LLP

(57) ABSTRACT

Disclosed is an electric caliper brake. The electric caliper brake includes a carrier including a pair of pad plates installed to be moveable forward and backward, a caliper housing configured to be installed to be slidable on the carrier and to have a cylinder in which a piston of which an inside is dug in a form of a cup is moveable forward and backward due to a brake hydraulic pressure, a power conversion unit including a spindle member installed to pass through a rear of the cylinder and rotating due to a rotational force delivered from an actuator and a nut member screw-coupled to the spindle member, disposed in the piston, moving forward and backward according to rotation of the spindle member, pressurizing the piston, and releasing the pressurizing, and a filling member configured to be disposed in the piston in such a way that rotation of the filling member is limited, the filling member being coupled to the nut member.

3 Claims, 3 Drawing Sheets

(51) Int. Cl.
  *F16D 125/06*  (2012.01)
  *F16D 125/40*  (2012.01)

(56) References Cited

U.S. PATENT DOCUMENTS

| | | | | |
|---|---|---|---|---|
| 2009/0120744 A1* | 5/2009 | Tristano | ................ | B60T 13/745 188/265 |
| 2011/0048869 A1* | 3/2011 | Schupska | .............. | B60T 13/745 188/71.1 |
| 2011/0132188 A1* | 6/2011 | Winkler | ..................... | F16J 1/12 92/108 |
| 2011/0315007 A1* | 12/2011 | Koch | ....................... | F16D 65/18 92/172 |
| 2012/0325597 A1* | 12/2012 | Giering | ................... | F16D 65/14 188/72.3 |
| 2014/0158480 A1* | 6/2014 | Qian | ..................... | F16D 55/226 188/72.6 |

* cited by examiner

【Fig. 1】
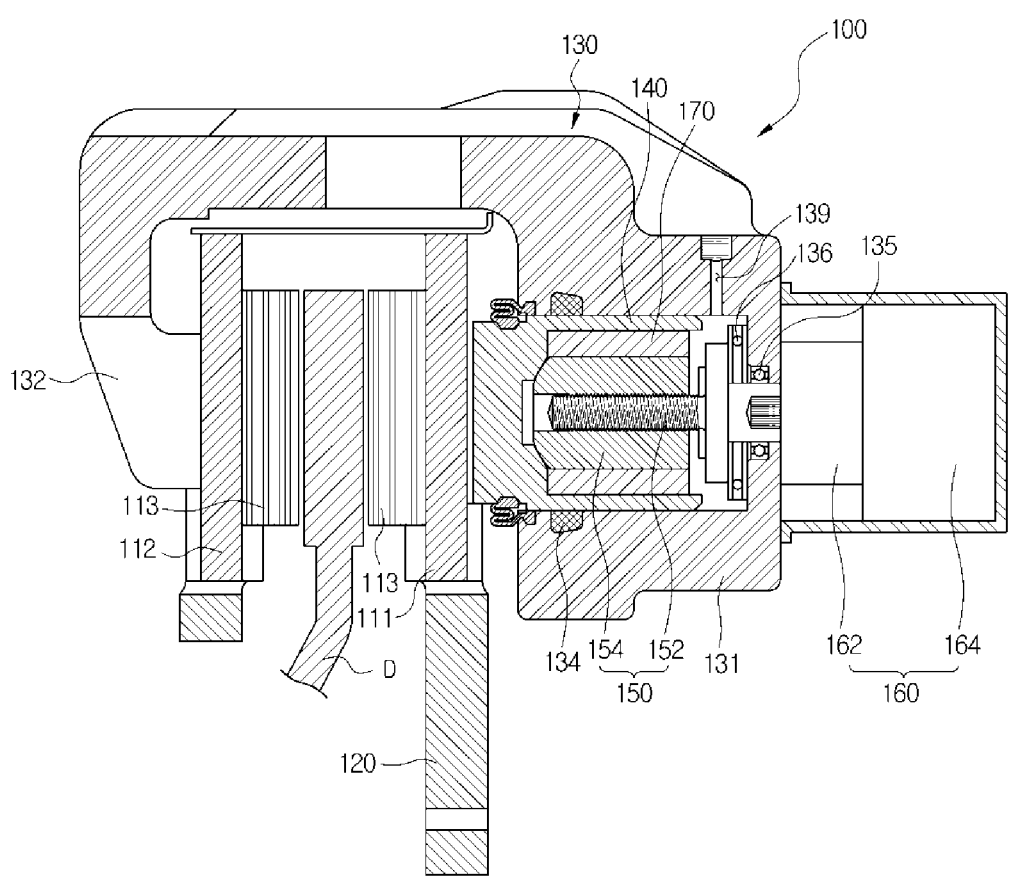

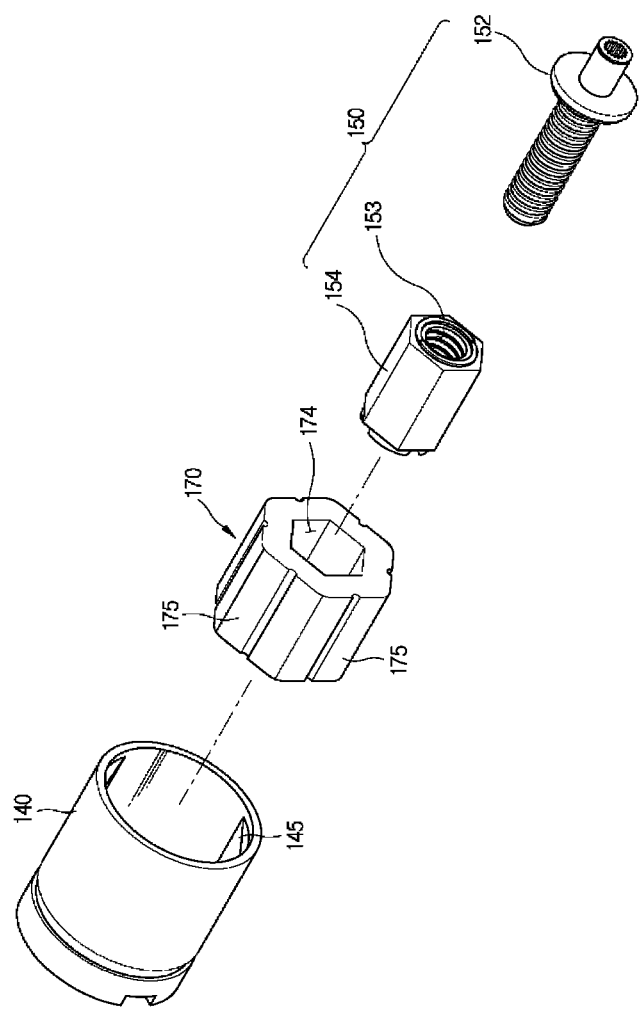
[Fig. 2]

[Fig 3]
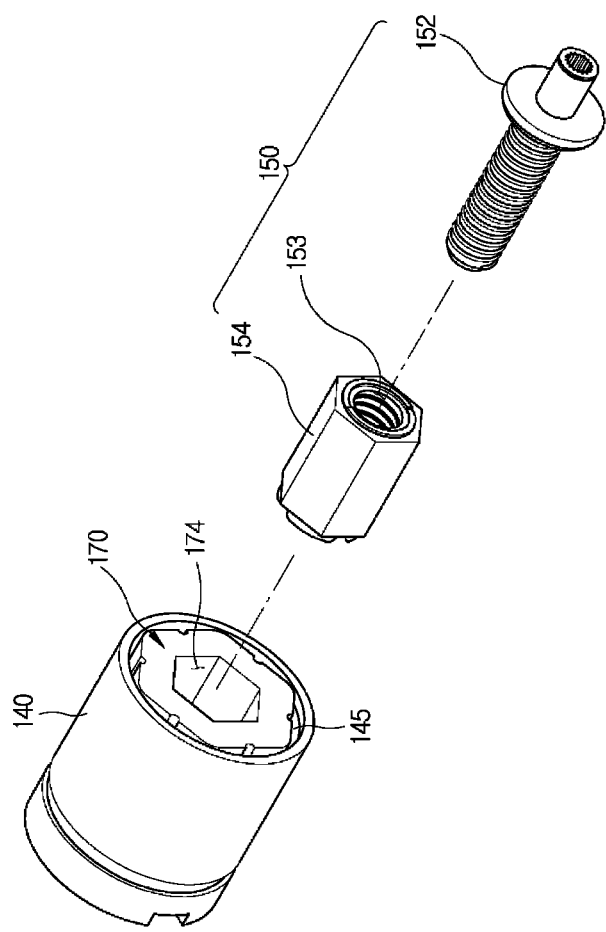

ELECTRIC CALIPER BRAKE

CROSS-REFERENCE TO RELATED APPLICATION

This application claims the benefit of Korean Patent Application No. 2015-0133593, filed on Sep. 22, 2015 in the Korean Intellectual Property Office, the disclosure of which is incorporated herein by reference.

BACKGROUND

1. Field

Embodiments of the present invention relate to an electric caliper brake, and more particularly, to an electric caliper brake capable of improving a pedal feeling by reducing a required brake oil amount during a brake operation.

2. Description of the Related Art

In general, an electric caliper brake employs an actuator that operates by electricity, in addition to a conventional hydraulic disk brake.

Korean Patent Registration No. 10-1220294 discloses an example of an electric disc brake system (hereinafter, referred to as an 'electric caliper brake'). According to the disclosed document, the electric caliper brake includes a disk that rotates together with wheels of a vehicle, a carrier including a pair of pad plates installed to be moveable forward and backward so as to pressurize the disk, a caliper housing installed to be slidable on the carrier and having a cylinder in which a piston is installed to be moveable forward and backward due to a brake hydraulic pressure, a spindle unit that pressurizes the piston, and a motor and a decelerator that deliver a rotational force to the spindle unit.

Such an electric caliper brake is configured to perform a brake operation by pressurizing the piston based on the brake hydraulic pressure or to perform a parking function by pressurizing the piston using the spindle unit that converts a rotational motion into a rectilinear motion due to the rotational force delivered from the motor.

In the electric caliper brake having the above configuration, a stroke (a pedal movement distance) of a brake pedal varies according to a required amount of brake oil to be delivered into the cylinder during a brake operation. That is, the required amount of brake oil has to be reduced such that a brake feeling is improved during the brake operation.

However, as a space is formed inside the cylinder to which the brake hydraulic pressure is supplied, i.e., inside the piston, the required amount of brake oil increases such that the brake feeling may be lowered.

PRIOR-ART DOCUMENT

Patent Document (Patent document) Korean Patent Registration No. 10-1220294 (MANDO Corporation) Jan. 3, 2013

SUMMARY

Therefore, it is an aspect of the present invention to provide an electric caliper brake that provides a filling member for filling an inside of a piston so that a required amount of brake oil can be reduced and thus a brake feeling can be improved.

Additional aspects of the invention will be set forth in part in the description which follows and, in part, will be obvious from the description, or may be learned by practice of the invention.

In accordance with one aspect of the present disclosure, an electric caliper brake comprising: a carrier including a pair of pad plates installed to be moveable forward and backward; a caliper housing configured to be installed to be slidable on the carrier and to have a cylinder in which a piston of which an inside is dug in a form of a cup is moveable forward and backward due to a brake hydraulic pressure; a power conversion unit including a spindle member installed to pass through a rear of the cylinder and rotating due to a rotational force delivered from an actuator and a nut member screw-coupled to the spindle member, disposed in the piston, moving forward and backward according to rotation of the spindle member, pressurizing the piston, and releasing the pressurizing; and a filling member configured to be disposed in the piston in such a way that rotation of the filling member is limited, the filling member being coupled to the nut member.

The filling member has a hollow portion of which a center is hollow, and the filling member is fitted and coupled into the piston.

The hollow portion has a polygonal shape, and the nut member has a shape corresponding to the hollow portion.

The filling member includes an anti-rotation surface having at least one plane on an outer circumferential surface of the filling member, and at least one anti-rotation jaw having a plane corresponding to the anti-rotation surface formed on the outer circumferential surface of the filling member is formed on an inner circumferential surface of the piston.

BRIEF DESCRIPTION OF THE DRAWINGS

These and/or other aspects of the invention will become apparent and more readily appreciated from the following description of the embodiments, taken in conjunction with the accompanying drawings of which:

FIG. 1 is a schematic cross-sectional view of an electric caliper brake according to an embodiment of the present invention;

FIG. 2 is an exploded perspective view of a coupled state of a piston, a filling member, and a power conversion unit provided in the electric caliper brake; and FIG. 3 is an exploded perspective view of a filling member press-fitted to a piston shown in FIG. 2.

DETAILED DESCRIPTION

Hereinafter, the present invention will be described in detail with reference to the accompanying drawings, in which exemplary embodiments of the invention are shown. The following embodiments are provided to fully deliver the spirit of the invention to those skilled in the art. The invention is not limited to the embodiments set forth herein, but may be embodied in different forms. In the drawings, for clarity of the invention, illustration of unrelated portions to the description is omitted, and for understanding, the sizes of elements may be slightly exaggerated.

FIG. 1 is a schematic cross-sectional view of an electric caliper brake according to an embodiment of the present invention, and FIG. 2 is an exploded perspective view of a coupled state of a piston, a filling member, and a power conversion unit provided in the electric caliper brake.

Referring to FIGS. 1 and 2, an electric caliper brake 100 according to an embodiment of the present invention includes a disk D that rotates together with wheels of a vehicle (not shown), a carrier 120 including a pair of pad plates 111 and 112 installed to be moveable forward and backward so as to pressurize the disk D, a caliper housing 130 installed to be slidable on the carrier 120 and having a cylinder 131 in which a piston 140 is installed to be moveable forward and backward due to a brake hydraulic pressure, a power conversion unit 150 that pressurizes the piston 140, an actuator 160 that delivers a rotational force to the power conversion unit 150, and a filling member 170 disposed in the piston 140 in such a way that rotation of the filling member 170 is limited.

The pair of pad plates 111 and 112 are classified into an inner pad plate 111 disposed to contact the piston 140 and an outer pad plate 112 disposed to contact a finger portion 132 of the caliper housing 130 that will be described later. The pair of pad plates 111 and 112 are installed on the carrier 120 fixed to a body of the vehicle to be moveable forward and backward in a direction of both sides of the disk D. Also, a frictional pad 113 is attached to one surface of each of the pad plates 111 and 112 that face the disk D.

The caliper housing 130 is installed to be slidable on the carrier 120. In more detail, the caliper housing 130 includes the cylinder 131, which is installed at the rear of the caliper housing 130 and includes the power conversion unit 150 and the piston 140 built in the cylinder 131 to be moveable forward and backward, and the finger portion 132, which is disposed in front of the caliper housing 130 and is formed to be bent in a downward direction so as to operate the outer pad plate 112. In this case, the finger portion 132 and the cylinder 131 are integrally formed.

The piston 140 has a cylindrical shape of which an inside is dug in the form of a cup, and is slidably inserted into the cylinder 131. In this case, at least one anti-rotation jaw 145 is formed on an inner circumferential surface of the piston 140. The anti-rotation jaw 145 will be described below again. The piston 140 pressurizes the inner pad plate 111 toward the disk D due to an axial force of the power conversion unit 150 that receives a rotational force of an actuator 160. Thus, when a hydraulic pressure for braking is applied into the cylinder 131, the piston 140 moves forward in a direction of the inner pad plate 111 to pressurize the inner pad plate 111, and the caliper housing 130 operates in an opposite direction to the piston 140 due to a reaction force, and the finger portion 132 pressurizes the outer pad plate 112 toward the disk D so that a brake operation can be performed.

Meanwhile, an oil port 139 through which brake oil is introduced into the cylinder 131, is formed in the caliper housing 130 so that the hydraulic pressure for braking can be applied into the cylinder 131, and a sealing member 134 for preventing leakage of oil is disposed between an outside surface of the piston 140 and an inside surface of the cylinder 131. The sealing member 134 is used to return the piston 140 into its original position when the brake operation is released, together with preventing leakage of brake oil introduced into the cylinder 131.

The power conversion unit 150 receives a rotational force from the actuator 160 including a motor 164 and a decelerator 162 and pressurizes the piston 140 toward the inner pad plate 111. In this case, the decelerator 162 is already a well-known technology and thus descriptions thereof will be omitted. The power conversion unit 150 includes a nut member 154, which is installed in the piston 140 and contacts the piston 140, and a spindle member 152 that is screw-coupled to the nut member 154.

The spindle member 152 is rotatably installed in such a way that one side of the spindle member 152 passes through the caliper housing 130, i.e., the cylinder 131, and the other side of the spindle member 152 is disposed in the piston 140. In this case, one side of the spindle member 152 that passes through the cylinder 131 is connected to the decelerator 162 and receives a rotational force of the motor 164, and a male screw thread is formed on an outer circumferential surface of the other side of the spindle member 152. In order to support the spindle member 152, a first bearing 135 and a second bearing 136 are installed in the cylinder 131 to be spaced apart from each other. Here, the second bearing 136 is a thrust bearing that receives a reaction force delivered through the spindle member 152 as the nut member 154 moves forward and backward during the brake operation.

A through hole 153 is formed in the center of the nut member 154 in a lengthwise direction so that the nut member 154 can be screw-coupled to the spindle member 152, and a female screw thread is formed in the through hole 153. Thus, the nut member 154 moves forward and backward according to a rotation direction of the spindle member 152, pressurizes the piston 140 and releases the pressurizing. The nut member 154 has to be provided in a rotation-limited state so as to make a rectilinear motion according to rotation of the spindle member 152. Thus, according to an embodiment of the present invention, the filling member 170 is disposed in the piston 140 and is used to limit rotation of the nut member 154.

In more detail, the filling member 170 is disposed in the piston 140 in a rotation-limited state and is coupled to the nut member 154. The filling member 170 has a hollow portion 174 of which a center is hollow, and is fitted and coupled into the piston 140, as illustrated in FIG. 3. In this case, the filling member 170 includes an anti-rotation surface 175 disposed on an outer circumferential surface of the filling member 170 and having at least one plane through which rotation of the anti-rotation surface 175 is limited. That is, the rotation of the anti-rotation surface 175 is limited by the anti-rotation jaw 145 formed on the inner circumferential surface of the piston 140. Thus, the anti-rotation jaw 145 formed on the piston 140 is formed to have a plane corresponding to the anti-rotation surface 175 formed on the outer circumferential surface of the filling member 170. As illustrated, the filling member 170 has a hexagonal shape, and two anti-rotation jaws 145 are formed on the inner circumferential surface of the piston 140. However, embodiments of the present invention are not limited thereto, and if the rotation of the filling member 170 is limitable, the number of anti-rotation surfaces 175 formed on the outer circumferential surface of the filling member 170 and the number of anti-rotation jaws 145 of the piston 140 may be increased or decreased.

Meanwhile, the hollow portion 174 formed in the center of the filling member 170 has a polygonal shape. Thus, the nut member 154 has a shape corresponding to that of the hollow portion 174. As illustrated, each of the hollow portion 174 and the nut member 154 has a hexagonal shape but may also have a pentagonal, a rectangular, or an oval shape. Thus, the nut member 154 is spaced apart from the hollow portion 174 by a predetermined distance and is inserted and coupled into the hollow portion 174 so that the rotation of the nut member 154 is limited and thus the nut member 154 makes a rectilinear motion according to the rotation of the spindle member 152.

As described above, as the filling member 170 limits the rotation of the nut member 154 and is fitted and coupled into the piston 140, the filling member 170 fills an internal space of the piston 140. Thus, the filling member 170 and the piston 140 are pressurized due to brake oil introduced from the oil port 139 and pressurize the piston 140 toward the disk D. That is, because the inside of the piston 140 is filled by the filling member 170, a required amount of brake oil introduced into the cylinder 131 is reduced compared to the related art so that a pedal feeling can be improved.

In an electric caliper brake according to an embodiment of the present invention, a filling member for filling an inside of a piston is provided so that a required amount of brake oil can be reduced and thus a brake feeling can be improved through an increase in a pedal force.

Meanwhile, the filling member is fitted and coupled into the piston so that an easy assemble performance can be acquired.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric caliper brake comprising:
a carrier including a pair of pad plates installed to be moveable forward and backward;
a caliper housing configured to be installed to be slidable on the carrier and to have a cylinder in which a piston of which an inside is dug in a form of a cup is moveable forward and backward due to a brake hydraulic pressure;
a power conversion unit including a spindle member installed to pass through a rear of the cylinder and rotating due to a rotational force delivered from an actuator and a nut member screw-coupled to the spindle member, disposed in the piston, moving forward and backward according to rotation of the spindle member, pressurizing the piston, and releasing the pressurizing; and
a filling member having a hollow portion of which a center is hollow and the filling member is fitted and coupled into the piston in such a way that rotation of the filling member is limited, the filling member being coupled to the nut member, wherein an outer circumferential surface of the filling member has a polygonal shape and the hollow portion has a polygonal shape, and the nut member has a shape corresponding to the hollow portion.

2. The electric caliper brake according to claim 1, wherein the filling member includes an anti-rotation surface having at least one plane on an outer circumferential surface of the filling member, and at least one anti-rotation jaw having a plane corresponding to the anti-rotation surface formed on the outer circumferential surface of the filling member is formed on an inner circumferential surface of the piston.

3. The electric caliper brake of claim 1, wherein the outer circumferential surface of the filling member has at least six sides, and an inner circumferential surface of the piston comprises at least two anti-rotation jaws.

\* \* \* \* \*